UNITED STATES PATENT OFFICE.

FRANCIS ELLERSHAUSEN, OF LONDON, ENGLAND.

PROCESS OF TREATING COMPLEX SULFID ORES.

SPECIFICATION forming part of Letters Patent No. 575,467, dated January 19, 1897.

Application filed September 5, 1896. Serial No. 605,023. (No specimens.)

*To all whom it may concern:*

Be it known that I, FRANCIS ELLERSHAUSEN, a subject of the Queen of Great Britain, residing at London, England, have invented new and useful Improvements in the Treatment of Complex Sulfid Ores; and I do hereby declare that the following is a full, clear, and exact description of the invention, which will enable others skilled in the art to which it appertains to make and use the same.

My invention has special reference to the treatment of ores containing zinc-blende and galena so closely intermixed that they cannot be entirely separated by mechanical means.

It is well known that sulfids of lead and zinc are decomposed by metallic iron if heated together, the lead being reduced to metal, while the zinc passes off as metallic zinc vapors; but so far no means have been discovered of treating complex ores upon a commercial scale to obtain this result.

According to my invention I avail myself of this knowledge and simultaneously effect the separation of the zinc and obtain the lead and precious metals from complex sulfid ores in a very expeditious and economical manner, as hereinafter more particularly described.

My process is as follows: I take the ore after crushing and mix it with some fluxing material, such as sulfate of soda, chlorid of sodium, or an alkali, and then place it in a reverberatory furnace which has a deep sump in the middle and raise it to a red heat as rapidly as possible. The fluxing material prevents oxidation of the ore and causes it to be rapidly converted into a pasty condition. When the ore has been thus treated, I pour upon it a sufficient quantity of molten metallic iron to effect the desulfurization of the ore, whereby the lead is immediately reduced and can be tapped off into pigs, carrying with it any silver and gold present, while the metallic zinc is given off as fumes which are converted by means of the air in the furnace into oxid of zinc, which is passed into collecting-chambers in the usual manner. The iron which has now taken up the sulfur of the ore is then removed by being tapped off or otherwise.

With certain classes of ore, that is to say, ore containing a large proportion of gangue, I find it advantageous before putting the ore in the furnace to make a bath of molten lead in the sump and put the ore in it, the object being to float the ore and prevent it adhering to the bottom of the sump. I then introduce the molten iron, as already described. After the iron has been removed the sump is cleared out, the slag removed, and the furnace is ready for another charge.

In practice I find it advantageous to employ a cupola placed in communication with the reverberatory furnace, so that molten iron from the cupola can be passed directly into the sump, whereby my process can be carried on continuously.

Having now particularly described and ascertained the nature of my said invention and in what manner the same is to be performed, I declare that what I claim is—

1. The described process for simultaneously separating the zinc (in the form of oxid of zinc) and obtaining the lead and precious metals from complex sulfid ores, such process consisting in rapidly heating the crushed ore (to which a sufficient quantity of fluxing material has been added to prevent oxidation) to red heat in a sump in a reverberatory furnace and then adding to the mixture, kept in a heated state, a sufficient quantity of molten metallic iron to effect the desulfurization of the ore, substantially as hereinbefore described.

2. The described process for simultaneously separating the zinc and obtaining the lead and precious metals from complex sulfid ores, which consists in preparing a bath of molten lead, introducing the ore into said bath with a fluxing material, heating it to red heat and then adding to the mixture kept in a heated state a sufficient quantity of molten metallic iron to effect the desulfurization of the ore, substantially as described.

FRANCIS ELLERSHAUSEN.

Witnesses:
    G. F. REDFERN,
    A. ABBOTT.